US006831757B1

(12) United States Patent
Terao

(10) Patent No.: US 6,831,757 B1
(45) Date of Patent: Dec. 14, 2004

(54) CONTROL METHOD OF NETWORK FACSIMILE APPARATUS

(75) Inventor: Yuichi Terao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/322,765

(22) Filed: May 21, 1999

(30) Foreign Application Priority Data

May 27, 1998 (JP) .......................................... 10-145475

(51) Int. Cl.$^7$ ............................................... H04N 1/00
(52) U.S. Cl. ........................ 358/400; 358/402; 358/403
(58) Field of Search ................................ 358/400, 403, 358/402

(56) References Cited

U.S. PATENT DOCUMENTS

| | | | | |
|---|---|---|---|---|
| 5,305,206 A | * | 4/1994 | Inoue et al. ................. | 715/531 |
| 5,881,233 A | * | 3/1999 | Toyoda et al. ............... | 708/233 |
| 6,157,706 A | * | 12/2000 | Rachelson ............. | 379/100.08 |
| 6,411,393 B1 | * | 6/2002 | Wakasugi ................... | 358/1.15 |
| 6,437,882 B1 | * | 8/2002 | Kanematsu et al. ........ | 358/437 |

OTHER PUBLICATIONS

U.S. Appl. No. 09/040,696, filed Mar. 18, 1998.
U.S. Appl. No. 09/080,734, filed May 18, 1998.
U.S. Appl. No. 09/132,298, filed Aug. 11, 1998.
U.S. Appl. No. 09/159,107, filed Sep. 23, 1998.

* cited by examiner

Primary Examiner—Edward Coles
Assistant Examiner—Houshang Safaipour
(74) Attorney, Agent, or Firm—Cooper & Dunham LLP

(57) ABSTRACT

A network facsimile apparatus is connected to a local area network, has a function of performing data transmission using electronic mail, and has a function of transmitting facsimile data to and receiving facsimile data from a facsimile apparatus using a predetermined facsimile transmission procedure via a public network. A control method of the network facsimile apparatus includes the steps of a) storing at least one distribution file; and b) when an instruction to transmit the distribution file has been given by a user, having the user specify the distribution file to be transmitted, having the user input a transmission-destination mail address, and transmitting the thus-specified distribution file to the thus-inputted mail address using the electronic mail.

14 Claims, 18 Drawing Sheets

FIG. 3

Message-ID: <3383313288.9876@abcd.co.jp>
Date: Tue,02 Jun 1998 12:00:00 +0900
To: user1@abcd.co.jp
From: ifax@abcd.co.jp
Subject: Manual document
MIME-Version: 1.0
Content-Type: multipart/mixed;boundary="--------------- 90894A908EF7655CAOF23E98"

--------------- 90894A908EF7655CAOF23E98
Content-Type: text
Content-Transfer-Encoding: 7bit
[Manual document]
      Name= User Manual     (MANUAL NAME)
      Version= #02         (VERSION NUMBER)
--------------- 90894A908EF7655CAOF23E98
Content-Type: image/tiff-f ;filename=Manual.tif
Content-Transfer-Encoding: base64

[MIME-ENCODED MANUAL PICTURE INFORMATION]

--------------- 90894A908EF7655CAOF23E98

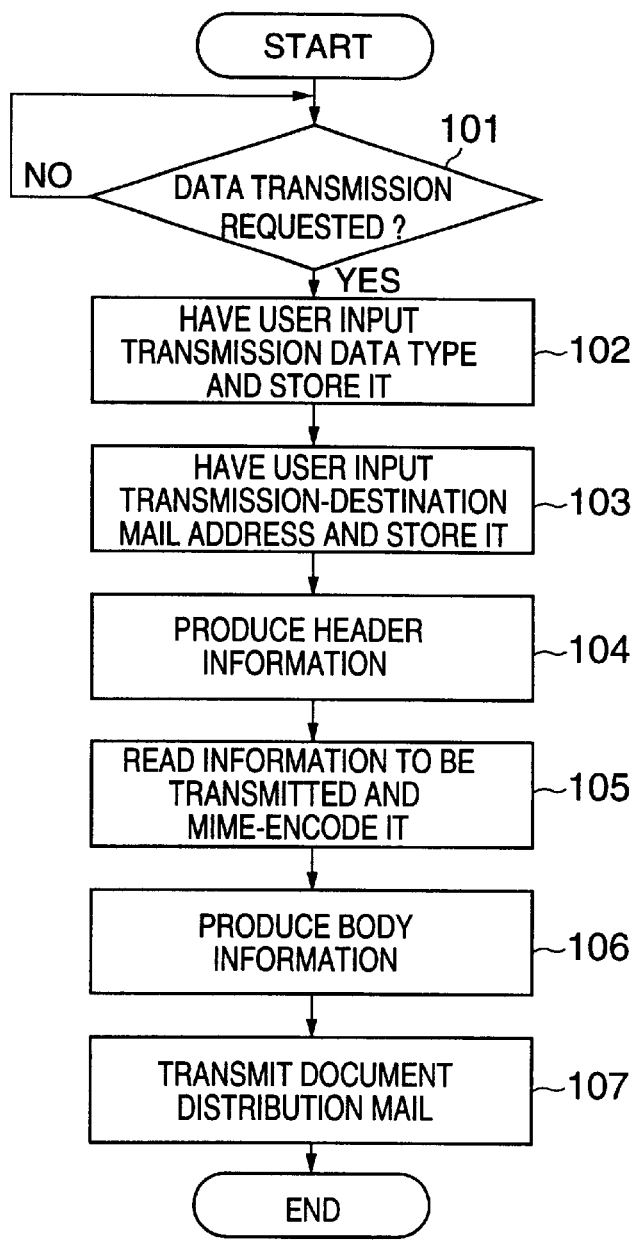

FIG. 5

```
Message-ID: <3383338988.9876@abcd.co.jp>
Date: Tue,02 Jun 1998 12:00:00 +0900
To: user 1@abcd.co.jp
From: ifax@abcd.co.jp
Subject: Manual document
MIME-Version: 1.0
Content-Type: multipart/mixed; boundary="--------------- 90894A908EF7655CAOF23E98"

--------------- 90894A908EF7655CAOF23E98
Content-Type: text
Content-Transfer-Encoding: 7bit
[Manual document]
        Name= Common User Manual          (MANUAL NAME)
        Version= #02                      (VERSION NUMBER)
        User Level=Commom User            (USER LEVEL INDICATION)
        Description=Commom Manual for I FAX-1000   (DESCRIPTION OF CONTENTS)
--------------- 90894A908EF7655CAOF23E98
Content-Type: image/tiff-f; filename=Manual-c.tif
Content-Transfer-Encoding: base64

[MIME-ENCODED MANUAL PICTURE INFORMATION]

--------------- 90894A908EF7655CAOF23E98
```

FIG. 6

```
Message-ID: <33833388.9876@abcd.co.jp>
Date: Tue,02 Jun 1998 13:00:00 +0900
To: user1@abcd.co.jp
From: ifax@abcd.co.jp
Subject: Send Manual document
MIME-Version: 1.0
Content-Type: multipart/mixed; boundary="--------------- 90894A908EF7655CAOF23E98"

--------------- 90894A908EF7655CAOF23E98
Content-Type: text
Content-Transfer-Encoding: 7bit
[Manual document]
        Name= Service Manual              (MANUAL NAME)
        Version= #01                      (VERSION NUMBER)
        User Level=Administrator User     (USER LEVEL INDICATION)
        Description=Service Manual for IFAX-1000   (DESCRIPTION OF CONTENTS)
--------------- 90894A908EF7655CAOF23E98
Content-Type: image/tiff-f; filename=Manual-s.tif
Content-Transfer-Encoding: base64

[MIME-ENCODED MANUAL PICTURE INFORMATION]

--------------- 90894A908EF7655CAOF23E98
```

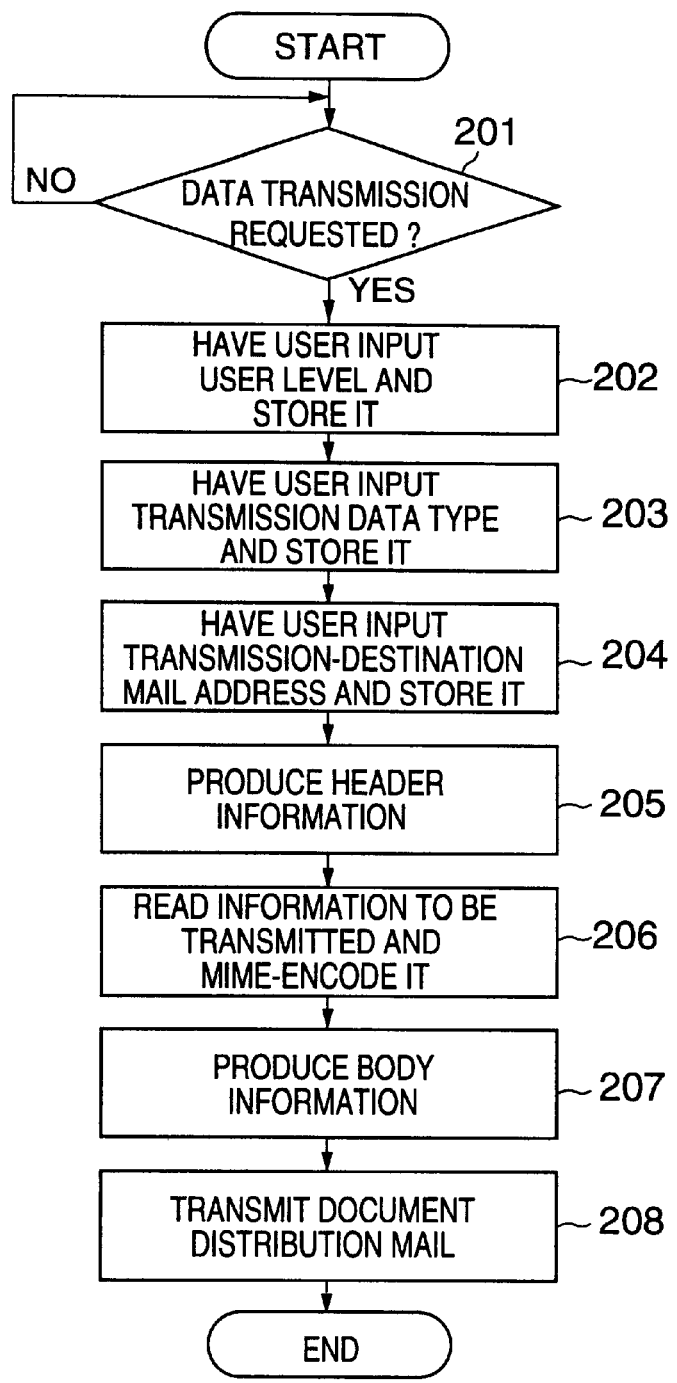

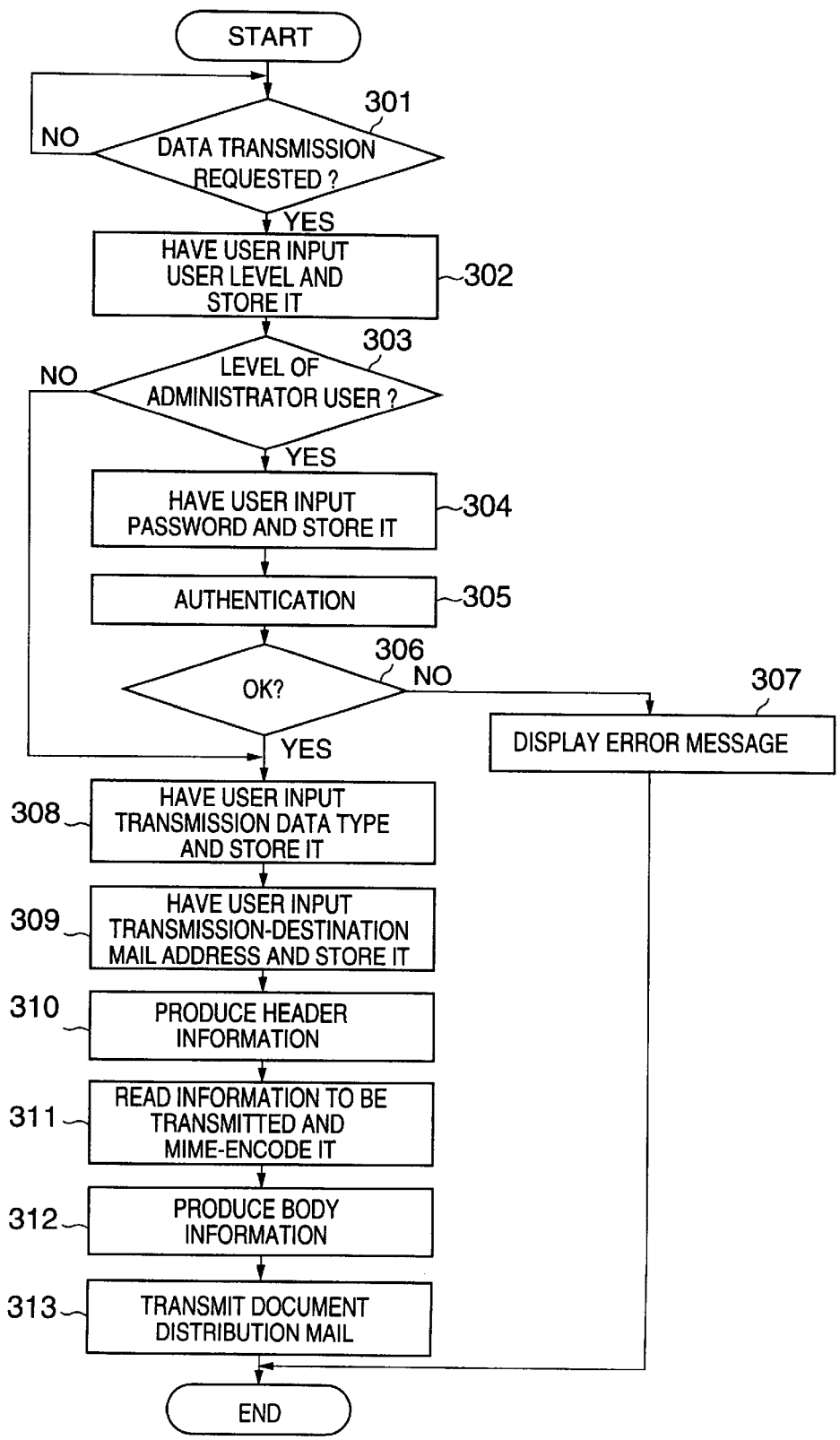

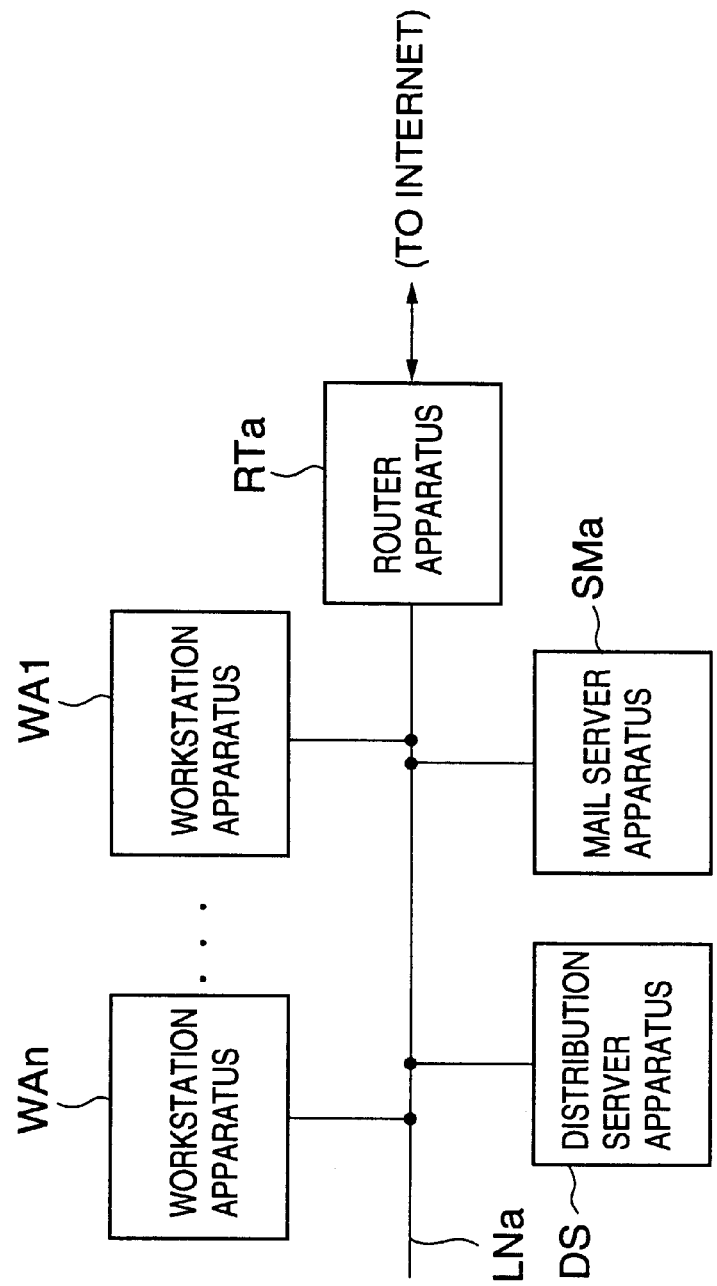

Message-ID: <33833388.9876@abcd.co.jp>
Date: Tue,02 Jun 1998 12:05:00 *+0900
To: distribute-server@***.co.jp
From: ifax@abcd.co.jp
Subject: Request User Manual
Content-Type: text/plain
Content-Transfer-Encoding: 7bit Request User Manual          (INDICATION OF MANUAL TRANSMISSION REQUEST)
Send to : user 1@abcd.co.jp   (MAIL ADDRESS OF TRANSMISSION-DESTINATION USER))

FIG. 12

```
Message-ID: <18763388.1580E3C4@***co.jp>
Date: Tue,02 Jun 1998 13:00:00 +0900
To: user1@abcd.co.jp
From : distribute-server@***.co.jp
Subject: Send Manual document
MIME-Version: 1.0
Content-Type:  multipart/mixed;  boundary="------------90894A908EF7655CAOF23E98"

---------------- 90894A908EF7655CAOF23E98
Content-Type: text
Content-Transfer-Encoding: 7bit
[Manual document]
        Name= User Manual        (MANUAL NAME)
        Version= #02             (VERSION NUMBER)
---------------- 90894A908EF7655CAOF23E98
Content-Type:image/tiff-f ;filename=Manual.tif
Content-Transfer-Encoding: base64

[MIME-ENCODED MANUAL PICTURE INFORMATION]

---------------- 90894A908EF7655CAOF23E98
```

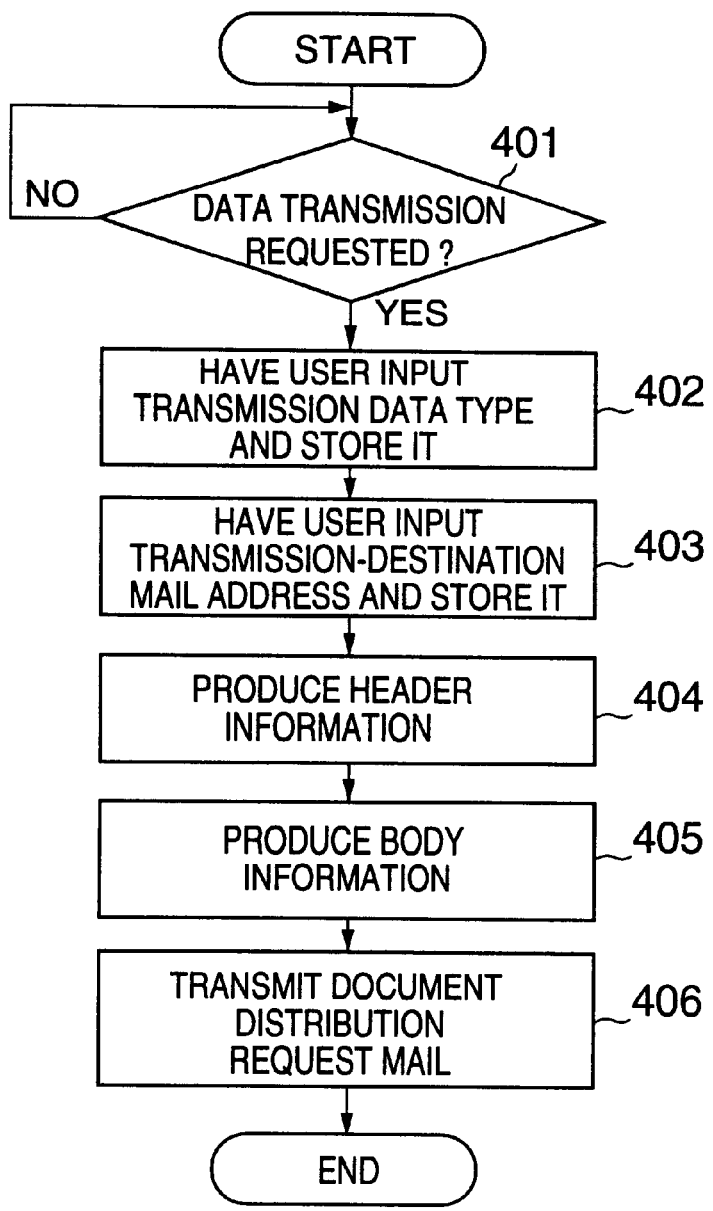

FIG. 15

```
Message-ID: <1234567890.9876@abcd.co.jp>
Date: Tue,02 Jun 1998 12:05:00 *+0900
To: distribute-server@***.co.jp
From: ifax@abcd.co.jp
Subject: Request User Manual
Content-Type: text/plain
Content-Transfer-Encoding: 7bit Request Common User Manual    (INDICATION OF MANUAL TRANSMISSION REQUEST)
User Level: Common User       (USER LEVEL INDICATION)
Send to : user1@abcd.co.jp    (MAIL ADDRESS OF TRANSMISSION-DESTINATION USER))
```

FIG. 16

```
Message-ID: <12453388.1580E3C4@***.co.jp>
Date: Tue,02 Jun 1998 13:00:00 +0900
To: user1@abcd.co.jp
From: distribute-server@***.co.jp
Subject: Send Manual document
MIME-Version: 1.0
Content-Type: multipart/mixed;boundary="-------------- 90894A908EF7655CAOF23E98"

--------------- 90894A908EF7655CAOF23E98
Content-Type: text
Content-Transfer-Encoding: 7bit
[Manual document]
      Name= Common User Manual              (MANUAL NAME)
      Version= #02                          (VERSION NUMBER)
      User Level= Commom User               (USER LEVEL INDICATION)
      Description= Commom Manual for IFAX-1000   (DESCRIPTION OF CONTENTS)
---------------90894A908EF7655CAOF23E98
Content-Type: image/tiff-f;  filename=Manual-c.tif
Content-Transfer-Encoding: base64

[MIME-ENCODED MANUAL PICTURE INFORMATION]

--------------- 90894A908EF7655CAOF23E98
```

FIG. 17

```
Message-ID:<33833388.9876@abcd.co.jp>
Date: Tue,02 Jun 1998 12:05:00 *+0900
To: distribute-server@***.co.jp
From: ifax@abcd.co.jp
Subject: Request Service Manual
Content-Type: text/plain
Content-Transfer-Encoding: 7bit Request Service Manual     (INDICATION OF MANUAL TRANSMISSION REQUEST)
User Level: Administrator User   (USER LEVEL INDICATION)
Send to : user 2@abcd.co.jp    (MAIL ADDRESS OF TRANSMISSION-DESTINATION USER))
```

FIG. 18

```
Message-ID: <98733388.1580E3C4@***.co.jp>
Date:Tue,02 Jun 1998 13:00:00 +0900
To: user1@abcd.co.jp
From: distribute-server@***.co.jp
Subject: Send Manual document
MIME-Version: 1.0
Content-Type: multipart/mixed; boundary="------------ 90894A908EF7655CAOF23E98"

--------------- 90894A908EF7655CAOF23E98
Content-Type: text
Content-Transfer-Encoding: 7bit
[Manual document]
        Name= Service Manual              (MANUAL NAME)
        Version= #01                      (VERSION NUMBER)
        User Level=Administrator User     (USER LEVEL INDICATION)
        Description=Service Manual for IFAX-1000   (DESCRIPTION OF CONTENTS)
---------------90894A908EF7655CAOF23E98
Content-Type: image/tiff-f; filename=Manual-s.tif
Content-Transfer-Encoding: base64

[MIME-ENCODED MANUAL PICTURE INFORMATION]

--------------- 90894A908EF7655CAOF23E98
```

CONTROL METHOD OF NETWORK FACSIMILE APPARATUS

BACKGROUND OF THE INVENTION

1. Field of the Invention

The present invention relates to a control method of a network facsimile apparatus which is connected to a local area network, has a function of transmitting data using electronic mail, and has a function of transmitting facsimile data to and receiving facsimile data from a facsimile apparatus via a public network using a predetermined facsimile transmission procedure.

2. Description of the Related Art

Recently, a network facsimile apparatus which is connected to a local area network, has a function of transmitting data using electronic mail, and has a function of transmitting facsimile data to and receiving facsimile data from a facsimile apparatus via a public network using a predetermined facsimile transmission procedure has been put to practical use.

By using such a network facsimile apparatus, it is possible to transmit picture information to and receive picture information from a plurality of workstation apparatuses which are connected to a local area network or the Internet, and a facsimile apparatus which is connected to a public network. Therefore, it is very convenient.

However, because such a network facsimile apparatus has very many functions because of the character of this apparatus, the size of an operation manual for explaining operations of the apparatus is large.

Therefore, the costs required for printing and binding the operation manual which is included with the network facsimile apparatus are high, and, also, because the weight of the operation manual is large, the costs required for transporting the operation manual together with the apparatus are high.

SUMMARY OF THE INVENTION

The present invention has been devised in consideration of the above-mentioned situation, and, an object of the present invention is to provide a control method of a network facsimile apparatus, in which method the costs required for an operation manual and so forth can be reduced.

A network facsimile apparatus is connected to a local area network, has a function of performing data transmission using electronic mail, and has a function of transmitting facsimile data to and receiving facsimile data from a facsimile apparatus using a predetermined facsimile transmission procedure via a public network. A control method of the network facsimile apparatus, according to the present invention, comprises the steps of:

a) storing at least one distribution file; and b) when an instruction to transmit the distribution file has been given by a user, having the user specify the distribution file to be transmitted, having the user input a transmission-destination mail address, and transmitting the thus-specified distribution file to the thus-inputted mail address using the electronic mail.

The above-mentioned at least one distribution file includes at least information of an operation manual of the network facsimile apparatus and a program file for performing a setting operation on the network facsimile apparatus via the local area network.

A user level is set for each of the above-mentioned at least one distribution file, and the method further comprises the step of c) when the user has given the instruction to transmit the distribution file, having the user input the user level, and having the user specify the distribution file to be transmitted from the distribution files for which the thus-input user level has been set.

A user level is set for each of the above-mentioned at least one distribution file, and the method further comprises the step of c) when the user has given the instruction to transmit the distribution file, having the user input the user level, and, in a case where the thus-input user level is a level of administrator user, performing an authentication operation for administrator users, and, when the authentication operation has succeeded, having the user specify the distribution file to be transmitted from the distribution files for which the level of administrator user has been set as the user level, but, in a case where the thus-input user level is a level of common user, having the user specify the distribution file to be transmitted from the distribution files for which the level of common users has been set as the user level.

A network facsimile apparatus is connected to a local area network which can be connected to the Internet, has a function of performing data transmission using electronic mail, and has a function of transmitting facsimile data to and receiving facsimile data from a facsimile apparatus using a predetermined facsimile transmission procedure via a public network. A control method of the network facsimile apparatus, according to another aspect of the present invention, comprises the steps of:

a) providing a distribution server in the Internet, in which distribution server at least one distribution file is stored; and b) when an instruction to transmit the distribution file has been given by a user, having the user specify the distribution file to be transmitted, having the user input a transmission-destination mail address, and transmitting first electronic mail requesting the distribution server to transmit the thus-specified distribution file to the thus-inputted mail address, the distribution server, when having received the first electronic mail, transmitting the specified distribution file to the specified transmission-destination mail address using second electronic mail.

The above-mentioned at least one distribution file includes at least information of an operation manual of the network facsimile apparatus and a program file for performing a setting operation on the network facsimile apparatus via the local area network.

A user level is set for each of the above-mentioned at least one distribution file, and the method further comprises the step of c) when the user has given the instruction to transmit the distribution file, having the user input the user level, and having the user specify the distribution file to be transmitted from the distribution files for which the thus-input user level has been set.

A user level is set for each of the above-mentioned at least one distribution file, and the method further comprises the step of c) when the user has given the instruction to transmit the distribution file, having the user input the user level, and, in a case where the thus-input user level is a level of administrator user, performing an authentication operation for administrator users, and, when the authentication operation has succeeded, having the user specify the distribution file to be transmitted from the distribution files for which the level of administrator user has been set as the user level, but, in a case where the thus-input user level is a level of common user, having the user specify the distribution file to be transmitted from the distribution files for which the level of common user has been set as the user level.

According to the present invention, the distribution file such as the operation manual or the like is transmitted to a user from the network facsimile apparatus using electronic mail. Thereby, it is not necessary to include the operation manual as printed matter with the network facsimile apparatus. As a result, it is possible to reduce the price of the network facsimile apparatus, reduce the labor at the time of transportation and setting thereof, and, also, eliminate a storage space for the operation manual as the printed matter in a usual operation of the network facsimile apparatus.

Further, because the operation manual in conformity to each user level can be distributed, the user can obtain the necessary operation manual, conveniently.

Further, when the level of administrator user has been inputted as the user level, authentication is performed using a password. Therefore, it is possible to prevent a problematic situation in which the service manual is distributed to a common user as a result of, for example, the common user incorrectly inputting the level of administrator users as the user level.

Further, the distribution file such as the operation manual is transmitted to the transmission-destination user from the distribution server apparatus provided in the Internet. Therefore, it is not necessary to store the distribution files in the network facsimile apparatus. As a result, it is possible to reduce the costs of the network facsimile apparatus.

Other objects and further features of the present invention will become more apparent from the following detailed description when read in conjunction with the accompanying drawings.

BRIEF DESCRIPTION OF THE DRAWINGS

FIG. 3 roughly shows an example of a document distribution mail;

FIG. 4 is a flowchart showing an example of processing performed by the network facsimile apparatus;

FIG. 5 roughly shows another example of the document distribution mail;

FIG. 6 roughly shows another example of the document distribution mail;

FIG. 7 is a flowchart showing another example of processing performed by the network facsimile apparatus;

FIG. 8 is a flowchart showing another example of processing performed by the network facsimile apparatus;

FIG. 9 is a block diagram showing a network system which is operated by a manufacturing company and is provided with a distribution server apparatus;

FIG. 12 roughly shows another example of the document distribution mail;

FIG. 13 is a flowchart showing another example of processing performed by the network facsimile apparatus;

FIG. 15 roughly shows another example of the document distribution request mail;

FIG. 16 roughly shows another example of the document distribution mail;

FIG. 17 roughly shows another example of the document distribution request mail;

FIG. 18 roughly shows another example of the document distribution mail;

DETAILED DESCRIPTION OF THE PREFERRED EMBODIMENT

An embodiment of the present invention will now be described in detail with reference to figures.

Figure 1:
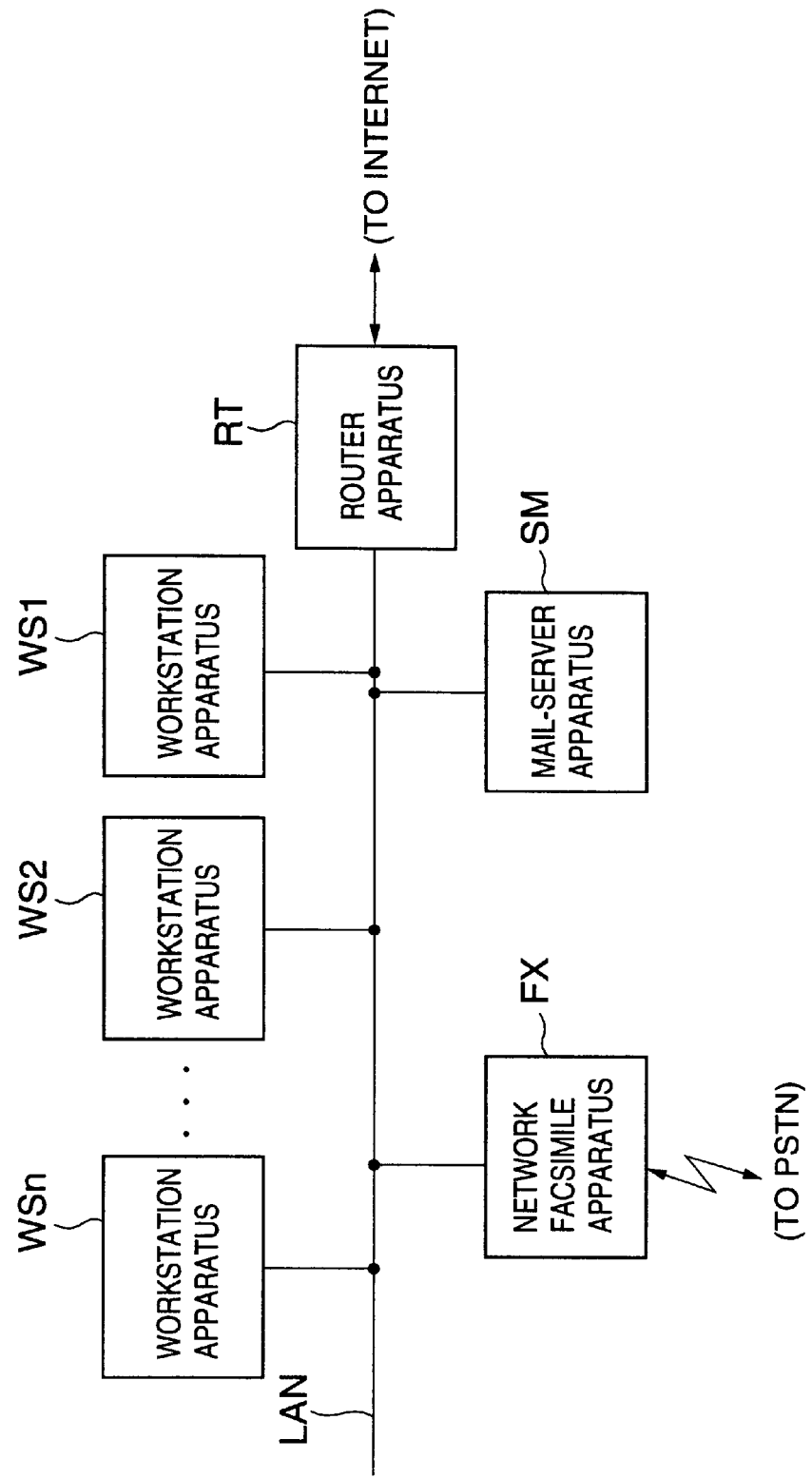
FIG. 1 is a block diagram showing a network system in one embodiment of the present invention.

FIG. 1 shows a network system in the embodiment of the present invention.

In the figure, a plurality of workstation apparatuses WS1 through WSn, a mail-server apparatus SM and a network facsimile apparatus FX are connected to a local area network LAN. The local area network LAN is connected to the Internet via a router apparatus RT, and, thereby, the workstation apparatuses WS1 through WSn, mail-server apparatus SM and network facsimile apparatus FX, which are connected to the local area network LAN, can transmit data to and receive data from another host apparatus and so forth via the Internet.

The mail-server apparatus SM provides a well-known service of collection and distribution of electronic mail for users who use the workstation apparatuses WS1 through WSn, and the network facsimile apparatus FX, which are connected to the local area network LAN.

Various programs such as facsimile application software (facsimile communication means) for executing the group-3 facsimile transmission procedure and also for producing and displaying so as to output facsimile picture information, and various software for transmission and reception of various data via the local area network LAN are introduced into the workstation apparatuses WS1 through WSn, and are used by a particular user. The particular user may be one user or a plurality of users.

The network facsimile apparatus FX has a server function for providing a facsimile-modem function and so forth for the workstation apparatuses WS1 through WSn which are connected to the local area network LAN. Further, the network facsimile apparatus FX has an electronic-mail processing function for transmission and reception of distribution files, such as picture information, an operation manual, service program data for performing a setting operation on the network facsimile apparatus FX via the local area network LAN, and so forth, as electronic mail. Furthermore, the network facsimile apparatus FX has a transmission function for connecting to a public network (PSTN) and transmitting picture information in accordance with the group-3 facsimile transmission procedure using the public network as a transmission path.

Figure 2:
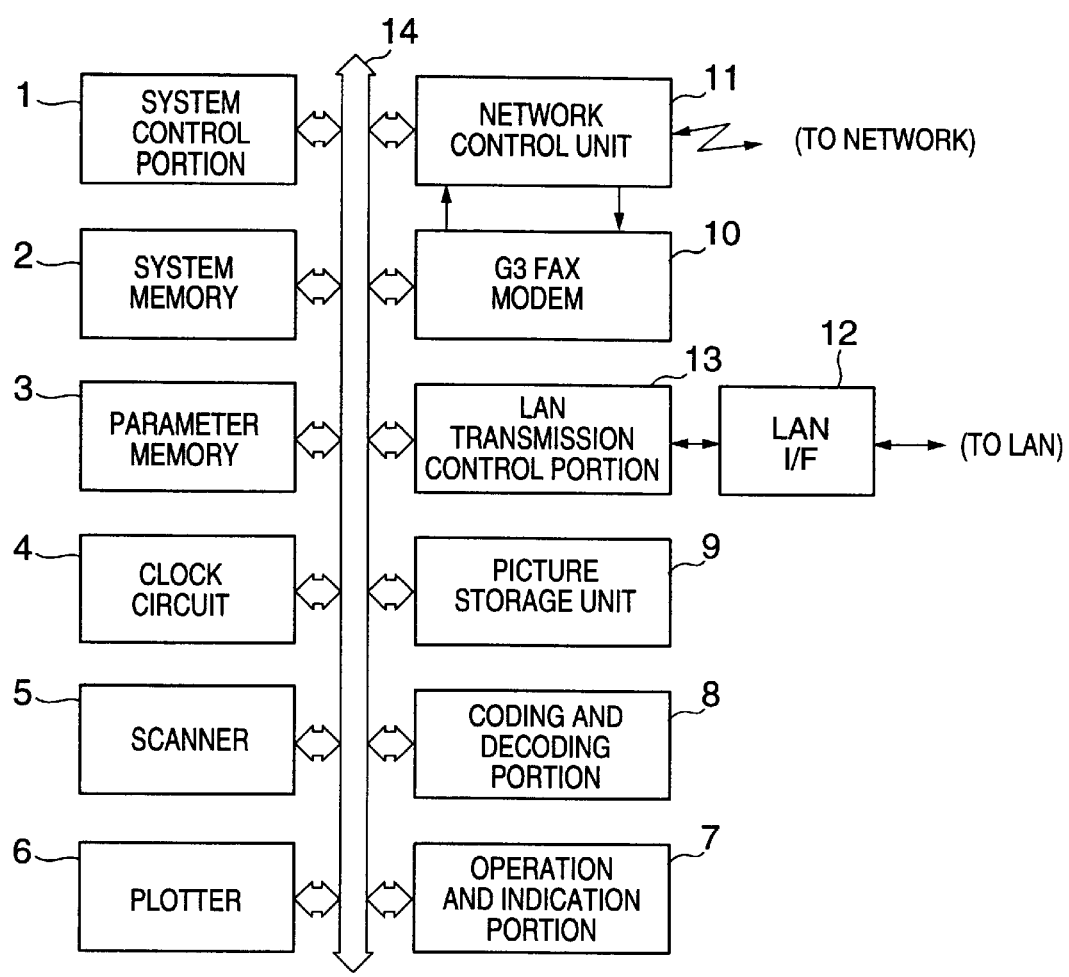
FIG. 2 is a block diagram showing an example of an arrangement of a network facsimile apparatus shown in FIG. 1.

FIG. 2 shows an example of an arrangement of the network facsimile apparatus FX.

In the figure, a system control portion 1 performs control processing of respective portions of the network facsimile apparatus FX, and performs various control processing such as facsimile transmission control procedure processing and so forth. In a system memory 2, a control processing program which the system control portion 1 executes, various data which is needed when the control processing program is executed, and the distribution files such as an operation manual, service program data for performing a setting operation on the network facsimile apparatus FX via the local area network LAN, and so forth are stored. Furthermore, the system memory 2 constitutes a work area for the system control portion 1. In a parameter memory 3, various information inherent to the network facsimile apparatus FX is stored. A clock circuit 4 outputs current-time information.

A scanner 5 reads an original picture at a predetermined resolution. A plotter 6 prints so as to output a picture at a predetermined resolution. An operation and indication portion 7 is used for operating the network facsimile apparatus FX, and includes various operation keys and various indicators.

A coding and decoding portion 8 codes and compresses a picture signal, and decodes and decompresses a coded and compressed picture signal into an original picture signal. A picture storage unit 9 is used for storing therein many sets of picture information in a coded and compressed condition.

A group-3 facsimile modem 10 is used for performing a group-3 facsimile modem function, and is provided with a low-speed modem (V.21 modem) for transmission and reception of a transmission procedure signal, and high-speed modems (V.17 modem, V.34 modem, V.29 modem, V.27 ter modem and so forth) for transmission and reception of, mainly, picture information.

A network control portion 11 is used for connecting the network facsimile apparatus FX to the public network (PSTN) and has an automatic calling and call-acceptance function.

A local-area-network interface circuit 12 is used for connecting the network facsimile apparatus FX to the local area network LAN. A local-area-network transmission control portion 13 is used for performing communication control processing of various predetermined protocol suits for transmitting various data to and receiving various data from other data terminal units via the local area network LAN.

The system control portion 1, system memory 2, parameter memory 3, clock circuit 4, scanner 5, plotter 6, operation and indication portion 7, coding and decoding portion 8, picture storage unit 9, group-3 facsimile modem 10, network control unit 11 and local-area-network transmission control portion 13 are connected to an internal bus 14. Transmission and reception of data between these components is performed mainly via the internal bus 14.

Transmission and reception of data between the network control unit 11 and group-3 facsimile modem 10 are performed directly.

In this embodiment, basically, transmission and reception of data between terminals connected to the local area network LAN are performed using a combination (so-called protocol suit) of transmission protocols up to transport layers called TCP/IP and communication protocols in upper layers higher than the transport layers. For example, in transmission and reception of data using electronic mail, the communication protocol, SMTP (Simple Mail Transfer Protocol), is used as a communication protocol in the upper layers.

The so-called POP (Post Office Protocol) may be used as a protocol which is used when each terminal performs reception acknowledgement of or transmission request for an electronic mail addressed to a user, or the like, to the mail-server apparatus SM.

The communication protocols such as TCP/IP, SMTP, POP and so forth, data formats and data structures of electronic mail and so forth are prescribed in the RFC (Request For Comments) documents published by the organization, IETF (Internet Engineering Task Force), which arranges technical contents concerning the Internet. For example, the TCP is prescribed in the RFC793, the IP is prescribed in the RFC793, the SMTP is prescribed in the RFC821, the formats of electronic mail are prescribed in RFC822, RFC1521, RFC1522 (MIME (Multipurpose Internet Mail Extension) format), and so forth.

Further, the network facsimile apparatus FX has a transfer-service function of transmitting a read original picture to another group-3 facsimile apparatus via the public network PSTN, or to users of the workstation apparatuses WS1 through WSn via the local area network LAN (further, via the Internet), and, also, transferring, using electronic mail, picture information received from another group-3 facsimile apparatus via the public network PSTN to the user corresponding to the sub-address specified when the picture information was received, or transferring picture information received from one of the workstation apparatuses WS1 through WSn connected to the local area network LAN to a group-3 facsimile apparatus, connected to the public network PSTN, corresponding to a specified shortened dialing number, and so forth.

When receiving electronic mail addressed to the network facsimile apparatus FX, the network facsimile apparatus FX extracts the picture information disposed in the body information of the electronic mail, and prints it out.

Facsimile picture information is binary data, and cannot be included in electronic mail directly. Therefore, a predetermined conversion method (for example, the Base64 encoding method) is used, facsimile picture information is thereby converted into readable information (7-bit character code), and the facsimile picture information in the thus-converted condition is included in the electronic mail. Such a format of the body information of the electronic mail is called the MIME format.

Further, as will be described later, in the present invention, the distribution file is transmitted to a specified mail address using electronic mail. However, when the contents of the distribution file are not readable information (for example, the contents of the distribution file are picture information, program data, or Japanese-language code information), electronic mail in the MIME format is used in a manner similar to that described above. As an encoding method used when such information is converted into the MIME information (information in the MIME format), other than the above-mentioned Base64 encoding method, an encoding method such as UUENCODE, Quoted-Printable or the like can be used. Encoding of information into the MIME information is called MIME-encoding.

In the above-described arrangement, when a user has given the network facsimile apparatus FX an instruction to transmit the distribution file, the network facsimile apparatus FX has the user input a type of the distribution file to be transmitted and the mail address of a user to which the distribution file is to be transmitted (transmission-destination user).

Then, the network facsimile apparatus FX produces electronic mail (referred to as document distribution mail, hereinafter) as shown in FIG. 3, and transmits the distribution file of the inputted type to the inputted mail address.

This document distribution mail is electronic mail in a multi-part MIME format in which the body information of the mail includes a plurality of parts (in this case, two parts). This document distribution mail is used when an operation manual has been inputted by a user as the type of the distribution file to be transmitted.

Further, in this case, in the first part of the body information of the document distribution mail, a section [Manual Document] is provided, the name of the operation manual to be transmitted is disposed in the 'Name' field of the section, and the version number of the operation manual to be transmitted is disposed in the 'Version' field of the section.

In the second part of the body information, the data obtained as a result of the data of the operation manual being MIME-encoded is disposed. The operation manual is of picture data in the TIFF-F format, the file name of which is 'Manual.tif', and the encoding method in the MIME-encoding is the Base64 encoding method.

In the 'To' field of the header information of the document distribution mail shown in FIG. 3, the inputted mail address of the transmission-destination user is disposed. In the 'From' field of the header information, the mail address of the network facsimile apparatus FX is disposed.

Therefore, the user who has received this document distribution mail can obtain the operation manual of the network facsimile apparatus FX by extracting the information of the operation manual (Manual.tif) from the thus-received document distribution mail.

FIG. 4 shows an example of processing performed by the network facsimile apparatus FX in this case.

When transmission of the data of the distribution file has been requested by a user (the result of the determination in a step 101 is Yes), the network facsimile apparatus FX has the user input thereto a type of the data of the distribution file to be transmitted, and stores therein the information of the thus-inputted type (in a step 102). Then, the network facsimile apparatus FX has the user input the mail address of a transmission-destination user, and stores therein the information of the thus-inputted mail address (in a step 103).

Then, the network facsimile apparatus FX produces the header information of the above-described document distribution mail based the thus-stored mail address of the transmission-destination user and the mail address of the network facsimile apparatus FX (in a step 104). Then, the network facsimile apparatus FX reads the information, to be transmitted, of the distribution file corresponding to the stored information of the type, and encodes the thus-read transmission information into the MIME information (in a step 105).

Then, the network facsimile apparatus FX produces the section [Manual document] which includes the identification information of the file to be transmitted and so forth, and produces the body information in the above-described multipart MIME format, which body information includes the thus-produced section and the MIME information produced in the step 105 (in a step 106). Then, the network facsimile apparatus FX transmits the thus-produced document distribution mail (in a step 107).

Thus, in this embodiment in this case, the distribution file such as the operation manual or the like is transmitted to a user from the network facsimile apparatus FX using electronic mail. Thereby, it is not necessary to include the operation manual as printed matter with the network facsimile apparatus FX. As a result, it is possible to reduce the price of the network facsimile apparatus FX, reduce the labor at the time of transportation and setting thereof, and, also, eliminate a storage space for the operation manual as the printed matter in a usual operation of the network facsimile apparatus FX.

When being classified roughly, the operation manual of the network facsimile apparatus FX includes two kinds of operation manuals: manuals for common users and service manuals to be used by users who perform maintenance and check work on the network facsimile apparatus FX (referred to as administrator users, hereinafter). The distribution files of the manuals for common users and the distribution files of the service manuals are stored in the network facsimile apparatus FX.

Because the service manuals include the contents of work which common users should not perform, it is not preferable that the service manuals are distributed to common users.

Therefore, it is preferable that two user levels, the level of common user and the level of administrator user, be provided, and that the manuals which common users can request to be distributed be limited. (In this case, the level of common users is set for the manuals for common users, and the level of administrator user is set for the service manuals.)

Therefore, in this case, when a user gives the network facsimile apparatus FX instructions to transmit the distribution file, the network facsimile apparatus FX has the user input thereto the user level, a type of the distribution file to be transmitted and the mail address of a transmission-destination user to whom the distribution file is to be transmitted. At this time, only a type of the distribution file corresponding to the inputted user level can be selected when a type of the distribution file is inputted.

When the level of common user has been inputted as the user level, the network facsimile apparatus FX produces the document distribution mail shown in FIG. 5, and transmits the distribution file of the inputted type (in this case, the distribution file of the manual for common users) to the inputted mail address.

In this case, in the first part of the body information of the document distribution mail, the section [Manual document] is provided. In the 'Name' field of the section, the name of the operation manual to be distributed is disposed. In the 'Version' field of the section, the version number of the operation manual to be transmitted is disposed. In the 'User Level' field of the section, the value indicating the user level at this time ('Common User') is disposed. In the 'Description' field of the section, the value indicating the name of the operation manual to be distributed ('Common Manual for IFAX-1000') is disposed.

In the second part of the body information, the data obtained as a result of the data of the operation manual being MIME-encoded is disposed. The operation manual is of picture data in the TIFF-F format, the file name of the operation manual is 'Manual-c.tif', and the encoding method in the MIME-encoding is the Base64 encoding method.

When the level of administrator user has been inputted as the user level, and the service manual has been selected as the type of the distribution file, the network facsimile apparatus FX produces the document distribution mail shown in FIG. 6, and transmits the distribution file of the inputted type (in this case, the distribution file of the service manual) to the inputted mail address.

In this case, in the first part of the body information of the document distribution mail, the section [Manual document] is provided. In the 'Name' field of the section, the name of the operation manual to be distributed is disposed. In the 'Version' field of the section, the version number of the operation manual to be transmitted is disposed. In the 'User Level' field of the section, the value indicating the user level at this time ('Administrator User') is disposed. In the 'Description' field of the section, the value indicating the name of the operation manual to be distributed ('Service Manual for IFAX-1000') is disposed.

In the second part of the body information, the data obtained as a result of the data of the operation manual being MIME-encoded is disposed. The operation manual is of picture data in the TIFF-F format, the file name of the operation manual is 'Manual-s.tif', and the encoding method in the MIME-encoding is the Base64 encoding method.

FIG. 7 shows an example of processing performed by the network facsimile apparatus FX in this case.

When transmission of the data of the distribution file has been requested by a user (the result of the determination in a step 201 is Yes), the network facsimile apparatus FX has the user input thereto the user level, and stores therein the thus-inputted user level (in a step 202). Then, the network facsimile apparatus FX has the user input thereto a type of the data of the distribution file to be transmitted corresponding to the inputted user level, and stores therein the information of the thus-inputted type (in a step 203). Then, the network facsimile apparatus FX has the user input the mail address of a transmission-destination user, and stores therein the thus-inputted mail address (in a step 204). In the step 203, for example, it is preferable that the network facsimile apparatus FX displays a list of the distribution files which can be requested by the user according to the inputted user level or which correspond to the inputted user level, and has the user select the distribution file from the contents of the displayed list.

Then, the network facsimile apparatus FX produces the header information of the above-described document distribution mail based on the thus-stored mail address of the transmission-destination user and the mail address of the network facsimile apparatus FX (in a step 205). Then, the network facsimile apparatus FX reads the information, to be transmitted, of the distribution file corresponding to the stored information of the type, and encodes the thus-read information into the MIME information (in a step 206).

Then, the network facsimile apparatus FX produces the section [Manual document] which includes the identification information of the file to be transmitted and so forth, and produces the body information in the above-described multi-part MIME format, which body information includes the thus-produced section and the MIME information produced in the step 206 (in a step 207). Then, the network facsimile apparatus FX transmits the thus-produced document distribution mail (in a step 208).

Thus, in this embodiment in this case, the distribution file such as the operation manual or the like is transmitted to a user from the network facsimile apparatus FX using electronic mail. Thereby, it is not necessary to include the operation manual as printed matter with the network facsimile apparatus FX. As a result, it is possible to reduce the price of the network facsimile apparatus FX, reduce the labor at the time of transportation and setting thereof, and, also, eliminate a storage space for the operation manual as the printed matter in a usual operation of the network facsimile apparatus FX.

Further, because the operation manual in conformity to each user level can be distributed, the user can obtain the necessary operation manual, conveniently.

A problematic situation in which the service manual is distributed to a common user occurs when the common user incorrectly has inputted the level of administrator user as the user level.

In order to prevent such a situation from occurring, it is preferable that a password for authentication of the administrator user be provided. Then, when the level of administrator user has been inputted as the user level by a user, the network facsimile apparatus FX requests the user to input the password. Then, the network facsimile apparatus FX compares the thus-inputted password with the password previously registered in the apparatus, so as to authenticate the user as an administrator user. Then, only when the user has been thus authenticated as an administrator user, can the user operate the network facsimile apparatus FX as the administrator user.

FIG. 8 shows an example of processing performed by the network facsimile apparatus FX in this case.

When transmission of the distribution file has been requested by a user (the result of the determination in a step 301 is Yes), the network facsimile apparatus FX has the user input thereto the user level, and stores therein the thus-inputted user level (in a step 302). Then, the network facsimile apparatus FX determines whether or not the inputted user level is the level of administrator user (in a step 303).

When it has been determined in the step 303 that the inputted user level is the level of administrator user (the result of the determination in the step 303 is Yes), the network facsimile apparatus FX requests the user to input the password, and, when the password has been inputted by the user, stores the thus-inputted password therein (in a step 304). Then, the network facsimile apparatus FX compares the thus-stored password with the password previously registered in the apparatus, so as to authenticate the user as an administrator user (in a step 305). Then, the network facsimile apparatus FX determines whether or not the result of the comparison in the step 305 is that the user has been authenticated as an administrator user (in a step 306).

When having determined in the step 306 that the result of the comparison in the step 305 is that the user has not been authenticated as an administrator user (the result of the determination in the step 306 is No), the network facsimile apparatus FX displays a message such as "the password is not correct" (in a step 307), and forcibly finishes this processing.

Either when having determined in the step 306 that the result of the comparison in the step 305 is that the user has been authenticated as an administrator user (the result of the determination in the step 306 is Yes) or when having determined in the step 303 that the inputted user level is not the level of administrator user (the result of the determination in the step 303 is No), the network facsimile apparatus FX has the user input thereto a type of the data of the distribution file to be transmitted, which type corresponds to the inputted user level, and stores therein the information of the thus-inputted type (in a step 308). Then, the network facsimile apparatus FX has the user input the mail address of a transmission-destination user, and stores therein the thus-inputted mail address (in a step 309). In the step 308, for example, it is preferable that the network facsimile apparatus FX displays a list of the distribution files which can be requested by the user according to the inputted user level or which correspond to the inputted user level, and has the user select the distribution file from the contents of the displayed list.

Then, the network facsimile apparatus FX produces the header information of the above-described document distribution mail based on the thus-stored mail address of the transmission-destination user and the mail address of the network facsimile apparatus FX (in a step 310). Then, the network facsimile apparatus FX reads the information, to be transmitted, of the distribution file corresponding to the stored information of the type, and encodes the thus-read information into the MIME information (in a step 311).

Then, the network facsimile apparatus FX produces the section [Manual document] which includes the identification information of the file to be transmitted and so forth, and produces the body information in the above-described multi-part MIME format, which body information includes the thus-produced section and the MIME information produced in the step 311 (in a step 312). Then, the network facsimile apparatus FX transmits the thus-produced document distribution mail (in a step 313).

Thus, in this embodiment, in this case, when the level of administrator user has been inputted as the user level, authentication is performed using the password. Therefore, it is possible to prevent the problematic situation in which the service manual is distributed to a common user as a result of, for example, the common user incorrectly inputting the level of administrator user as the user level.

In this embodiment in each of the above-described cases, the distribution files such as the operation manuals and so forth are stored in the network facsimile apparatus FX. Therefore, the necessary storage capacity of the system memory 2 in which the distribution files are stored is large. As a result, the costs of the apparatus are high.

In order to avoid such a situation, for example, a company which manufactures the network facsimile apparatus FX may provide a distribution server for distributing the distribution files such as operation manuals and so forth in the Internet, and, the distribution files are distributed to transmission-destination users from the distribution server.

FIG. 9 shows an example of a network system which is operated by a manufacturing company and includes a distribution server apparatus DS.

In the figure, to a local area network LNa, a plurality of workstation apparatuses WA1 through WAn, a mail server apparatus SMa and the distribution server apparatus DS are connected.

Further, the local area network LNa is connected to the Internet via a router apparatus RTa, and, thereby, the workstation apparatuses WA1 through WAn, mail server apparatus SMa and the distribution server apparatus DS can transmit data to and receive data from other host apparatuses and so forth via the Internet.

In other words, the distribution server apparatus DS can transmit electronic mail to and receive electronic mail from another host apparatus connected to the Internet, appropriately. Therefore, the distribution server apparatus DS can transmit electronic mail to and receive electronic mail from the network facsimile apparatus FX connected to the Internet.

The mail server apparatus SMa provides the well-known service of collection and distribution of electronic mail for users who use the workstation apparatuses WA1 through WAn, connected to the local area network LNa, and for the distribution server apparatus DS.

The distribution server apparatus DS stores therein the operation manuals of the network facsimile apparatus FX and so forth, and, also, when distribution of the distribution file is requested via electric mail, transmits the requested distribution file to a requested mail address using electronic mail.

Figures 10, 11:
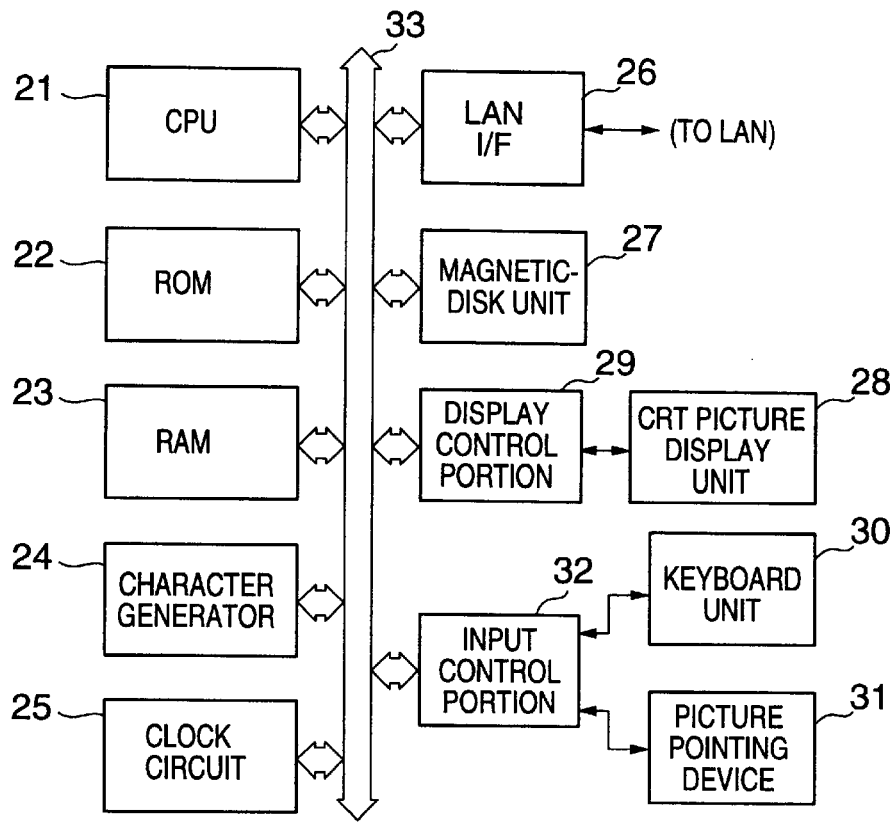
FIG. 10 is a block diagram showing an example of an arrangement of the distribution server apparatus.
FIG. 11 roughly shows an example of a document distribution request mail.

FIG. 10 shows an example of an arrangement of the distribution server apparatus DS.

In the figure, a CPU (Central Processing Unit) 21 controls operation of the distribution server apparatus DS. In a ROM (Read-Only Memory) 22, programs and necessary data, which are used by the CPU 21 at the time of starting up, and so forth are stored. A RAM (Random Access Memory) 23 constitutes a work area, for the CPU 21, and so forth.

A character generator 24 generates data for displaying figures and characters. A clock circuit 25 outputs information of the current date and time. A local-area-network interface circuit 26 connects the distribution server apparatus DS to the local area network LNa.

A magnetic-disk unit 27 is used for storing various data such as various application programs, work data, file data, picture-information data, the distribution files and so forth. A CRT picture display unit 28 displays pictures used for operating the distribution server apparatus DS. A display control portion 29 controls the contents displayed by the CRT picture display unit 28.

A keyboard unit 30 is used for operating the distribution server apparatus DS through various key operations. A picture pointing device 31 is used for performing operation work such as pointing at an arbitrary point on a picture displayed by the CRT picture display unit 28. An input control portion 32 is used for obtaining information which has been input through the keyboard unit 30 and picture pointing device 31.

The CPU 21, ROM 22, RAM 23, character generator 24, clock circuit 25, local-area-network interface circuit 26, magnetic-disk unit 27, display control portion 29 and input control portion 32 are connected to a bus 33. Transmission and reception of data between these components is performed mainly via the bus 33.

In the above-described arrangement, when a user has given the network facsimile apparatus FX instructions to transmit the distribution file, the network facsimile apparatus FX has the user input thereto a type of the distribution file to be transmitted and the mail address of a transmission-destination user.

Then, the network facsimile apparatus FX produces electronic mail shown in FIG. 11 (referred to as document distribution request mail, hereinafter), and transmits the thus-produced document distribution request mail to the distribution server apparatus DS so as to request the distribution server apparatus DS to transmit the distribution file, the type of which has been inputted by the user, to the mail address, which has been inputted by the user.

In the 'To' field of the header information of the document distribution request mail, the mail address of the distribution server apparatus DS (in this case, 'distribute-server@***.co.jp') is disposed. In the 'From' field of the header information, the mail address of the network facsimile apparatus FX is disposed.

In the body information of the document distribution request mail, a character row indicating the manual transmission request 'Request User Manual', and a character row indicating the mail address of the transmission-destination user 'Send to: user1@abcd.co.jp' are disposed.

When having received this document distribution request mail, the distribution server apparatus DS produces the document distribution mail shown in FIG. 12, and transmits the thus-produced document distribution mail to the transmission-destination user, so as to transmit the requested distribution file to the transmission-destination user.

This document distribution mail is electronic mail in the multi-part MIME format including a plurality of parts (in this case, two parts), and is used when the operation manual is distributed as the distribution file.

Further, in this case, in the first part of the body information of the document distribution mail, the section [Manual Document] is provided, the name of the operation manual to be transmitted is disposed in the 'Name' field of this section, and the version number of the operation manual to be transmitted is disposed in the 'Version' field of the section.

In the second part of the body information, the data obtained as a result of the data of the operation manual being MIME-encoded is disposed. The operation manual is of picture data in the TIFF-F format, the file name of the operation manual is 'Manual.tif', and the encoding method in the MIME-encoding is the Base64 encoding method.

In the 'To' field of the header information of the document distribution mail, the mail address of the transmission-destination user is disposed. In the 'From' field of the header information, the mail address of the distribution server apparatus DS is disposed.

Thereby, the transmission-destination user receives this document distribution mail, which includes the information of the operation manual, from the distribution server apparatus DS. Then, by extracting the information of the operation manual from the thus-received document distribution mail, the transmission-destination user can obtain the operation manual of the network facsimile apparatus FX.

FIG. 13 shows an example of processing performed by the network facsimile apparatus FX in this case.

When transmission of the data of the distribution file has been requested by a user (the result of the determination in a step 401 is Yes), the network facsimile apparatus FX has the user input thereto a type of the data of the distribution file to be transmitted, and stores therein the information of the thus-inputted type (in a step 402). Then, the network facsimile apparatus FX has the user input the mail address of a transmission-destination user, and stores therein the thus-inputted mail address (in a step 403).

Then, the network facsimile apparatus FX produces the header information of the above-mentioned document distribution request mail based on the previously stored mail address of the distribution server apparatus DS and the mail address of the network facsimile apparatus FX (in a step 404). Then, the network facsimile apparatus FX produces the body information of the above-described document distribution request mail based on the information of the type stored in said step 402 and the mail address of the transmission-destination user stored in said step 403 (in a step 405). Then, the network facsimile apparatus FX transmits the thus-produced document distribution request mail (in a step 406).

Figure 14:
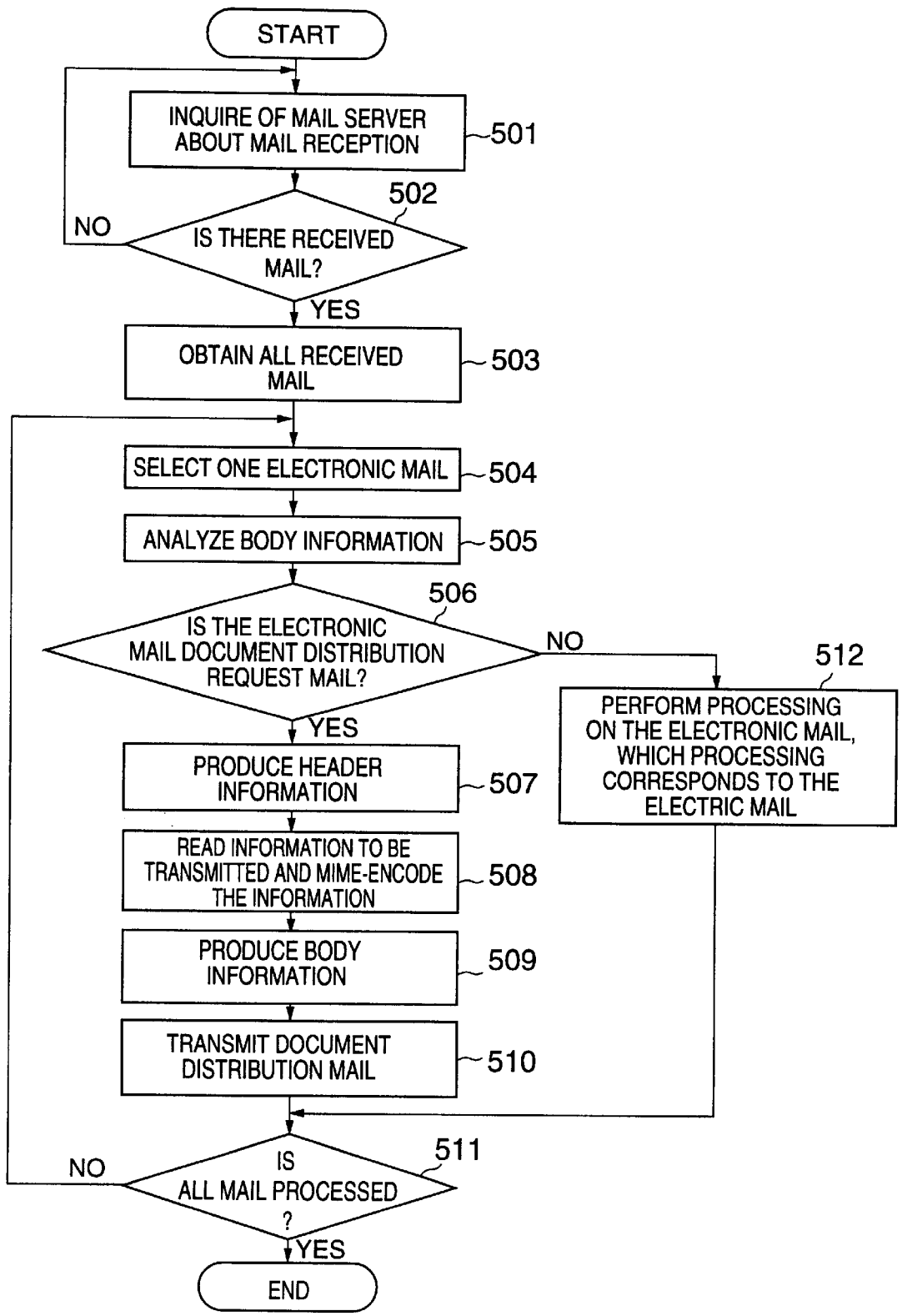
FIG. 14 is a flowchart showing an example of processing performed by the distribution server apparatus at the time of reception of electronic mail.

FIG. 14 shows an example of processing performed by the distribution server apparatus DS at the time of reception of electronic mail.

First, the distribution server apparatus DS inquires of the mail server apparatus SMa whether electronic mail addressed to the distribution server apparatus DS has been received (in a step 501). When received mail has been stored in the mail server apparatus SMa (Yes of the result of the determination in the step 502), the distribution server apparatus DS obtains all the received mail, which has been stored, from the mail server apparatus SMa (in a step 503).

Then, the distribution server apparatus DS selects one electronic mail, which is to be processed, from the thus-obtained received mail (in a step 504). Then, the distribution server apparatus DS analyzes the body information of the thus-selected electronic mail (in a step 505), and determines whether or not this electronic mail is the document distribution request mail (in a step 506).

When the result of the determination in the step 506 is Yes, the distribution server apparatus DS extracts the mail address of the transmission-destination user from the contents 'Send to: user1@abcd.co.jp' of the received document distribution request mail, and produces the header information of the above-mentioned document distribution mail based on the thus-extracted mail address and the mail address of the distribution server apparatus DS (in a step 507). Then, the distribution server apparatus DS reads the information of the distribution file to be transmitted, corresponding to the type of the manual 'User Manual' which has been extracted from the body information of the received document distribution request mail, and encodes the thus-read information to the MIME information (in a step 508).

Then, the distribution server apparatus DS produces the section [Manual document] which includes the identification information of the file to be transmitted and so forth, and produces the body information in the multi-part MIME format such as that described above, which body information includes the thus-produced section and the MIME information produced in the step 508 (in a step 509). Then, the distribution server apparatus DS transmits the thus-produced document distribution mail (in a step 510).

Then, the distribution server apparatus DS determines whether or not all the received mail has been processed (in a step 511). When the result of the determination in the step 511 is No, the distribution server apparatus DS returns to the step 504, and performs processing of the subsequent received mail. When the result of the determination in the step 511 is Yes, the distribution server apparatus DS finishes this processing.

When the result of the determination in the step 506 is No, the distribution server apparatus DS performs processing on the received mail, which processing corresponds to the received mail. Then, the distribution server apparatus DS proceeds to the step 511 and performs processing of the steps starting from the step 511.

Thus, in this embodiment in this case, the distribution file such as the operation manual or the like is transmitted to the transmission-destination user from the distribution server apparatus DS provided in the Internet. Therefore, it is not necessary to store the distribution files in the network facsimile apparatus FX. As a result, it is possible to reduce the costs of the network facsimile apparatus FX.

As described above, when being classified roughly, the operation manuals of the network facsimile apparatus FX include two kinds of operation manuals: manuals for common users and service manuals to be used by administrator users. The distribution files of the manuals for common users and the distribution files of the service manuals are stored in the distribution server apparatus DS.

Then, two user levels, the level of common user and the level of administrator user, are provided, and the manuals which common users can request to be distributed are limited.

In this case, when a user gives the network facsimile apparatus FX instructions to transmit the distribution file, the network facsimile apparatus FX has the user input thereto the user level, a type of the distribution file to be transmitted and the mail address of a transmission-destination user to whom the distribution file is to be transmitted. At this time, only a type of the distribution file corresponding to the inputted user level can be selected when a type of the distribution file is inputted.

When the level of common user has been inputted as the user level, the network facsimile apparatus FX produces the document distribution request mail such as that shown in FIG. 15, and transmits the thus-produced mail to the distribution server apparatus DS.

In the 'To' field of the header information of the document distribution request mail, the mail address of the distribution server apparatus DS (in this case, 'distribute-server@***.co.jp'), which is previously registered in the network facsimile apparatus FX, is disposed. In the 'From' field of the header information, the mail address of the network facsimile apparatus FX is disposed.

In the body information of the document distribution request mail, a character row indicating the manual transmission request 'Request Common User Manual', a character row indicating the user level 'User level: Common User', and the character row indicating the mail address of the transmission-destination user 'Send to: user1@abcd.co.jp' are disposed.

When having received this document distribution request mail, the distribution server apparatus DS produces the document distribution mail shown in FIG. 16, in order to transmit the requested distribution file, and transmits the thus-produced document distribution mail to the transmission-destination user.

In this case, in the first part of the body information of the document distribution mail, the section [Manual Document] is provided, the name of the operation manual to be transmitted is disposed in the 'Name' field of this section, the version number of the operation manual to be transmitted is disposed in the 'Version' field of the section, the value indicating the user level at this time ('Common User') is disposed in the 'User Level' field of the section, and the value indicating the name of the operation manual to be distributed ('Common Manual for IFAX1000') is disposed in the 'Description' field of the section.

In the second part of the body information, the data obtained as a result of the data of the operation manual being MIME-encoded is disposed. The operation manual is of picture data in the TIFF-F format, the file name of the operation manual is 'Manual-c.tif', and the encoding method in the MIME-encoding is the Base64 encoding method.

When the level of administrator user has been inputted as the user level, the network facsimile apparatus FX produces the document distribution request mail such as that shown in FIG. 17, and transmits the thus-produced mail to the distribution server apparatus DS.

In the 'To' field of the header information of the document distribution request mail, the mail address of the distribution server apparatus DS (in this case, 'distribute-server@***.co.jp'), which is previously registered in the network facsimile apparatus FX, is disposed. In the 'From' field of the header information, the mail address of the network facsimile apparatus FX is disposed.

In the body information of the document distribution request mail, a character row indicating the manual transmission request 'Request Service Manual', a character row indicating the user level 'User level: Administrator User', and the character row indicating the mail address of the transmission-destination user 'Send to: user1@abcd.co.jp' are disposed.

When having received this document distribution request mail, the distribution server apparatus DS produces the document distribution mail shown in FIG. 18, in order to transmit the requested distribution file, and transmits the thus-produced document distribution mail to the transmission-destination user.

In this case, in the first part of the body information of the document distribution mail, the section [Manual Document] is provided, the name of the operation manual to be transmitted is disposed in the 'Name' field of this section, the version number of the operation manual to be transmitted is disposed in the 'Version' field of the section, the value indicating the user level at this time ('Administrator User') is disposed in the 'User Level' field of the section, and the value indicating the name of the operation manual to be distributed ('Service Manual for IFAX-1000') is disposed in the 'Description' field of the section.

In the second part of the body information, the data obtained as a result of the data of the operation manual being MIME-encoded is disposed. The operation manual is of picture data in the TIFF-F format, the file name of the operation manual is 'Manual-s.tif', and the encoding method in the MIME-encoding is the Base64 encoding method.

Figure 19:
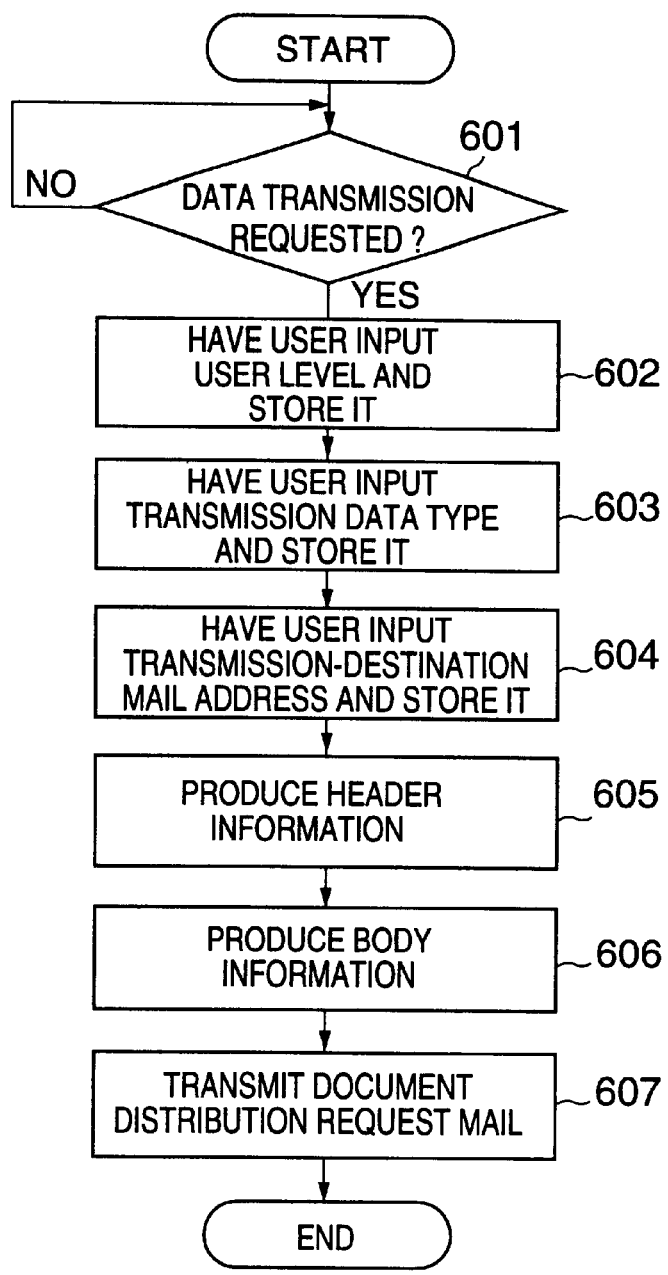
FIG. 19 is a flowchart showing another example of processing performed by the network facsimile apparatus.

FIG. 19 shows an example of processing performed by the network facsimile apparatus FX in this case.

When transmission of the data of the distribution file has been requested by a user (the result of the determination in a step 601 is Yes), the network facsimile apparatus FX has the user input thereto the user level, and stores therein the thus-inputted user level (in a step 602). Then, the network facsimile apparatus FX has the user input thereto a type of the data of the distribution file to be transmitted, the type corresponding to the inputted user level, and stores therein the information of the thus-inputted type (in a step 603). Then, the network facsimile apparatus FX has the user input the mail address of a transmission-destination user, and stores therein the thus-inputted mail address (in a step 604). In the step 603, for example, it is preferable that the network facsimile apparatus FX displays a list of the distribution files which can be requested by the user according to the inputted user level, or which correspond to the inputted user level and has the user select the distribution file from the contents of the displayed list.

Then, the network facsimile apparatus FX produces the header information of the above-described document distribution request mail, as shown in FIG. 15 or 17, based on the previously stored mail address of the distribution server apparatus DS and the mail address of the network facsimile apparatus FX (in a step 605). Then, the network facsimile apparatus FX produces the body information of the above-described document distribution request mail, as shown in FIG. 15 or 17, based on the information of the type stored in the step 603, the user level stored in the step 602 and the mail address of the transmission-destination user stored in the step 604 (in a step 606). Then, the network facsimile apparatus FX transmits the thus-produced document distribution request mail (in a step 607).

Processing performed by the distribution server apparatus DS when the distribution server apparatus DS has received this document distribution request mail can be similar to the processing shown in FIG. 14, and, therefore, the description thereof will be omitted.

Figure 20:
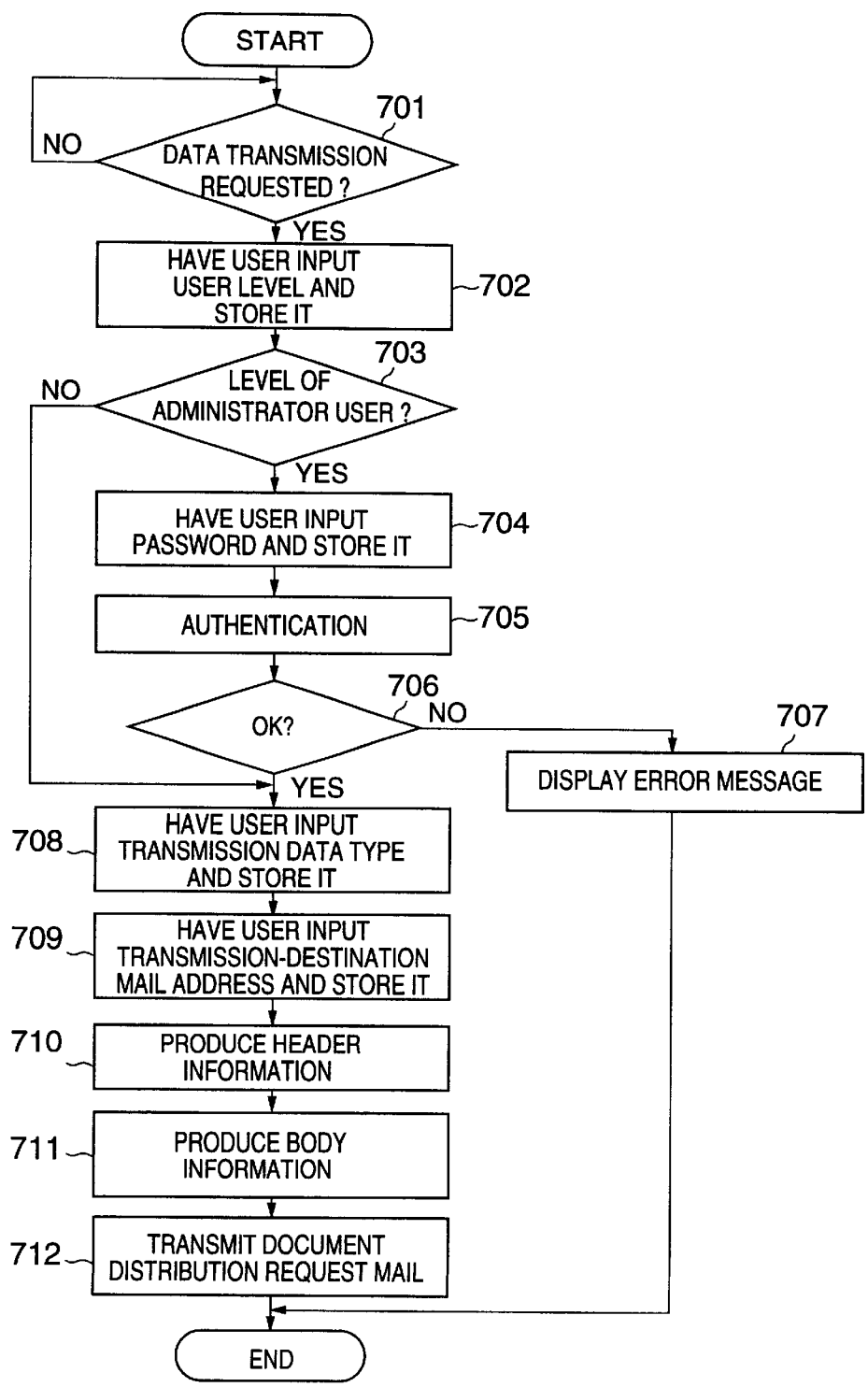
FIG. 20 is a flowchart showing another example of processing performed by the network facsimile apparatus.

FIG. 20 shows an example of processing performed by the network facsimile apparatus FX in a case where the password authentication is performed for administrator users.

When transmission of the distribution file has been requested by a user (the result of the determination in a step 701 is Yes), the network facsimile apparatus FX has the user input thereto the user level, and stores therein the thus-inputted user level (in a step 702). Then, the network facsimile apparatus FX determines whether or not the inputted user level is the level of administrator user (in a step 703).

When it has been determined in the step 703 that the inputted user level is the level of administrator user (the result of determination in the step 703 is Yes), the network facsimile apparatus FX requests the user to input the password, and, when the password has been inputted by the user, stores the thus-inputted password therein (in a step 704). Then, the network facsimile apparatus FX compares the thus-stored password with the password previously registered in the apparatus, so as to authenticate the user as an administrator user (in a step 705). Then, the network facsimile apparatus FX determines whether or not the result of the comparison in the step 705 is that the user has been authenticated as an administrator user (in a step 706).

When having determined in the step 706 that the result of the comparison in the step 705 is that the user has not been authenticated as an administrator user (the result of the determination in the step 706 is No), the network facsimile apparatus FX displays a message such as "the password is not correct" (in a step 707), and forcibly finishes this processing.

Either when having determined in the step 706 that the result of the comparison in the step 705 is that the user has been authenticated as an administrator user (the result of the determination in the step 706 is Yes) or when having determined in the step 703 that the inputted user level is not the level of administrator user (the result of the determination in the step 703 is No), the network facsimile apparatus FX has the user input thereto a type of the data of the distribution file to be transmitted, the type corresponding to the inputted user level, and stores therein the information of the thus-inputted type (in a step 708). Then, the network facsimile apparatus FX has the user input the mail address of a transmission-destination user, and stores therein the thus-inputted mail address (in a step 709). In the step 708, for example, it is preferable that the network facsimile apparatus FX displays a list of the distribution files which can be requested by the user according to the inputted user level or which correspond to the inputted user level, and has the user select the distribution file from the contents of the displayed list.

Then, the network facsimile apparatus FX produces the header information of the above-described document distribution request mail, as shown in FIG. 15 or 17, based on the previously stored mail address of the distribution server apparatus DS and the mail address of the network facsimile apparatus FX (in a step 710). Then, the network facsimile apparatus FX produces the body information of the above-described document distribution request mail, as shown in FIG. 15 or 17, based on the information of the type stored in the step 708, the user level stored in the step 702 and the mail address of the transmission-destination user stored in the step 709 (in a step 711). Then, the network facsimile apparatus FX transmits the thus-produced document distribution request mail (in a step 712).

Processing performed by the distribution server apparatus DS when the distribution server apparatus DS has received this document distribution request mail can be similar to the processing shown in FIG. 14, and, therefore, the description thereof will be omitted.

In a case where the distribution server apparatus DS provides a service of distributing the distribution files for a plurality of types of the network facsimile apparatuses FX, an item indicating a type of the network facsimile apparatus FX is provided in the above-described document distribution request mail. Then, the distribution server apparatus DS identifies the type of the network facsimile apparatus FX based on the contents of the thus-provided item, the distribution file for the thus-identified type of the network facsimile apparatus FX being one to be distributed.

Figure 21:
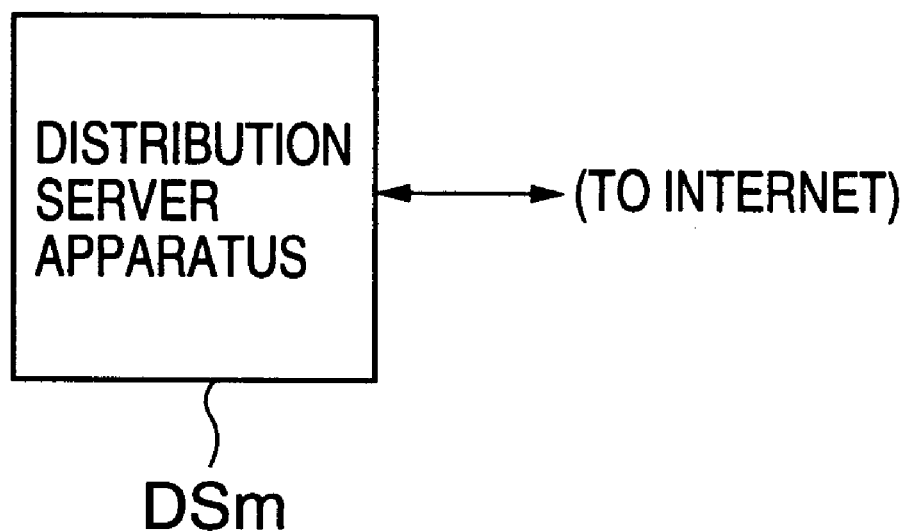
FIG. 21 is a block diagram showing another example of a manner of connection of the distribution server apparatus.

Further, the above-described distribution server apparatus DS is connected to the network system which the manufacturing company operates. However, it is also possible that the distribution server apparatus alone is connected to the Internet, as shown in FIG. 21. However, in this case, this distribution server apparatus DSm needs to have the mail-server function.

In the above-described document distribution mail, because the operation manual has been selected as the distribution file, the section [Manual document] is provided in the first part of the body information. However, in a case where a service program (application data) for performing setting of the network facsimile apparatus FX and so forth has been selected as the distribution file, a section [Service program] is provided, and the file name, version name and so forth of the service program to be transmitted are disposed there. Further, it is preferable to set the user level for the service program so that the service program can be distributed only to administrator users.

Further, the data format of the operation manual as the distribution file is not necessarily limited to picture information as in the above-described embodiment. The data format of the operation manual as the distribution file may be, for example, a text document, a document of a specific application program (for example, a Japanese-language word-processor software), or a source file (substantially, a text document) described using a general-purpose mark-up language such as SGML, HTML, TeX or the like.

Further, in the above-described embodiment, the document distribution mail is formed by electronic mail in the multi-part MIME format consisting of the two parts. However, it is also possible to form the document distribution mail by electronic mail in a MIME format consisting of a single part. Further, it is possible to dispose various control information (information disposed in the first part) such as the name of the distribution file and so forth in, for example, a 'Subject' field or a so-called 'X-' field (extension field) of the header information.

Further, the present invention is not limited to the above-described embodiment, and variations and modifications may be made without departing from the scope of the present invention.

The present application is based on Japanese priority application No. 10-145475 filed on May 27, 1998, the entire contents of which are hereby incorporated by reference.

What is claimed is:

1. A control method of a network facsimile apparatus, which is connected to a local area network, has a function of performing data transmission using electronic mail, and has a function of transmitting facsimile data to and receiving facsimile data from a facsimile apparatus using a predetermined facsimile transmission procedure via a public network, said method comprising the steps of:

a) storing at least one distribution file; and
   b) when an instruction to transmit the distribution file has been given by a user, having said user specify the distribution file to be transmitted, having said user input a transmission-destination mail address, and transmitting the thus-specified distribution file to the thus-inputted mail address using the electronic mail,
   wherein said at least one distribution file includes at least information of an operation manual of said network facsimile apparatus, and the distribution file including different contents of the operation manual can be specified by the user according to a user operation authority level input by the user.

2. The control method of the network facsimile apparatus as claimed in claim 1, wherein said at least one distribution file includes at least a program file for performing a setting operation on said network facsimile apparatus via said local area network.

3. The control method of the network facsimile apparatus as claimed in claim 1, wherein a user level is set for each of said at least one distribution file, and said method further comprises the step of c) when the user has given the instruction to transmit the distribution file, having said user input the user level, and having said user specify the distribution file to be transmitted from the distribution files for which the thus-input user level has been set.

4. The control method of the network facsimile apparatus as claimed in claim 1, wherein a user level is set for each of said at least one distribution file, and said method further comprises the step of c) when the user has given the instruction to transmit the distribution file, having said user input the user level, and, in a case where the thus-input user level is a level of administrator user, performing an authentication operation for administrator users, and, when said authentication operation has succeeded, having said user specify the distribution filed to be transmitted from the distribution files for which said level of administrator user has been set as the user level, but, in a case where the thus-input user level is a level of common user, having said user specify the distribution file to be transmitted from the distribution files for which said level of common user has been set as the user level.

5. A control method of a network facsimile apparatus, which is connected to a local area network which can be connected to the Internet, has a function of performing data transmission using electronic mail, and has a function of transmitting facsimile data to and receiving facsimile data from a facsimile apparatus using a predetermined facsimile transmission procedure via a public network, said method comprising the steps of:

a) providing a distribution server in the Internet, in which distribution server at least one distribution file is stored; and b) when an instruction to transmit the distribution file has been given by a user, having said user specify the distribution file to be transmitted, having said user input a transmission-destination mail address, and, then, transmitting first electronic mail requesting said distribution server to transmit the thus-specified distribution file to the thus-inputted mail address, said distribution server, when having received said first electronic mail, transmitting the specified distribution file to the specified transmission-destination mail address using second electronic mail, wherein said at least one distribution file includes at least information of an operation manual of said network facsimile apparatus, and the distribution file including different contents of the operation manual can be specified by the user according to a user operation authority level input by the user.

6. The control method of the network facsimile apparatus as claimed in claim 5, wherein said at least one distribution file includes at least a program file for performing a setting operation on said network facsimile apparatus via said local area network.

7. The control method of the network facsimile apparatus as claimed in claim 5, wherein a user level is set for each of said at least one distribution file, and said method further comprises the step of c) when the user has given said instruction to transmit the distribution file, having said user input the user level, and having said user specify the distribution files for which the thus-input user level has been set.

8. The control method of the network facsimile apparatus as claimed in claim 5, wherein a user level is set for each of said at least one distribution file, and said method further comprises the step of c) when the user has given instructions to transmit the distribution file, having said user input the user level, and, in a case where the thus-input user level is a level of administrator user, performing an authentication operation for administrator users, and, when said authentication operation has succeeded, having said user specify the distribution file to be transmitted from the distribution files for which said level of administrator user has been set as the user level, but, in a case where the thus-input user level is a level of common user, having said user specify the distribution file to be transmitted from the distribution files for which said level of common user has been set as the user level.

9. A control method of a network facsimile apparatus, which is connected to a local area network, has a function of performing data transmission using electronic mail, and has a function of transmitting facsimile data to and receiving facsimile data from a facsimile apparatus using a predetermined facsimile transmission procedure via a public network, said method comprising the steps of:

a) storing at least one distribution file;

b) determining whether or not a user has given an instruction to transmit the distribution file;

c) when the result of the determination in said step b) is yes, having said user input a type of the distribution file to be transmitted, and storing information of the thus-inputted type;

d) having said user input a transmission-destination mail address, and storing the thus-inputted mail address;

e) producing header information of document-distribution electronic mail based on the mail address stored in said step d);

f) reading information of the distribution file, the information of the type of which distribution file was stored in said step c);

g) encoding the thus-read information into information in a format such that the thus-encoded information can be included in said document-distribution electronic mail;

h) producing body information of said document-distribution electronic mail, which body information includes the information in said format obtained in said step g); and i) transmitting the thus-produced document-distribution electronic mail to the mail address specified in said header information, wherein said at least one distribution file includes at least information of an operation manual of said network facsimile apparatus, and the distribution file including different contents of the operation manual can be specified by the user according to a user operation authority level input by the user.

10. A control method of a network facsimile apparatus, which is connected to a local area network, has a function of performing data transmission using electronic mail, and has a function of transmitting facsimile data to and receiving facsimile data from a facsimile apparatus using a predetermined facsimile transmission procedure via a public network, said method comprising the steps of:

a) storing at least one distribution file;

b) setting a user operation authority level for each of said at least one distribution file;

c) determining whether or not a user has given an instruction to transmit the distribution file;

d) when the result of the determination in said step c) is yes, having said user input the user operation authority level, and storing the thus-inputted user operation authority level;

e) having said user input a type of the distribution file to be transmitted, said type corresponding to the user operation authority level inputted in said step d); and storing information of the thus-inputted type;

f) having said user input a transmission-destination mail address, and storing the thus-inputted mail address;

g) producing header information of document-distribution electronic mail based on the mail address inputted in said step f);

h) reading information of the distribution file, the information of the type of which distribution file was stored in said step e);

i) encoding the thus-read information into information in a format such that the thus-encoded information can be included in said document-distribution electronic mail;

j) producing body information of said document-distribution electronic mail, which body information includes the information in said format obtained in said step i); and k) transmitting the thus-produced document-distribution electronic mail to the mail address specified in said header information, wherein said at least one distribution file includes at least information of an operation manual of said network facsimile apparatus, and the distribution file including different contents of the operation manual can be specified by the user according to the user operation authority level input by the user.

11. A control method of a network facsimile apparatus, which is connected to a local area network, has a function of performing data transmission using electronic mail, and has a function of transmitting facsimile data to and receiving facsimile data from a facsimile apparatus using a predetermined facsimile transmission procedure via a public network, said method comprising the steps of:

a) storing at least one distribution file;

b) setting a user operation authority level for each of said at least one distribution file;

c) determining whether or not a user has given an instruction to transmit the distribution file;

d) when the result of the determination in said step c) is yes, having said user input the user operation authority level, and storing the thus-inputted user operation authority level;

e) determining whether or not the user operation authority level inputted in said step d) is a level of administrator user;

f) when the result of the determination in said step e) is yes, having said user input a password;

g) comparing the password inputted in said step f) with a previously stored password so as to determine whether or not said user is authenticated as an administrator user;

h) either when the result of the determination in said step g) is yes or when the result of the determination in said step e) is no, having said user input a type of the distribution file to be transmitted, said type corresponding to the user operation authority level stored in said step d), and storing information of the thus-inputted type;

i) having said user input a transmission-destination mail address, and storing the thus-inputted mail address;

j) producing header information of document-distribution electronic mail based on the mail address inputted in said step i);

k) reading information of the distribution file, the information of the type of which distribution file was stored in said step h);

l) encoding the thus-read information into information in a format such that the thus-encoded information can be included in said document-distribution electronic mail;

m) producing body information of said document-distribution electronic mail, which body information includes the information in said format obtained in said step l); and n) transmitting the thus-produced document-distribution electronic mail to the mail address specified in said header information, wherein said at least one distribution file includes at least information of an operation manual of said network facsimile apparatus, and the distribution file including different contents of the operation manual can be specified by the user according to the user operation authority level input by the user.

12. A control method of a network facsimile apparatus, which is connected to a local area network which can be connected to the Internet, has a function of performing data transmission using electronic mail, and has a function of transmitting facsimile data to and receiving facsimile data from a facsimile apparatus using a predetermined facsimile transmission procedure via a public network, said method comprising the steps of:

a) providing a distribution server in the Internet, in which distribution server at least one distribution file is stored;

b) determining whether or not a user has given an instruction to transmit the distribution file;

c) when the result of the determination in said step b) is yes, having said user input a type of the distribution file to be transmitted, and storing information of the thus-inputted type;

d) having said user input a transmission-destination mail address, and storing the thus-inputted mail address;

e) producing header information of document-distribution electronic mail based on a mail address of said distribution server;

f) producing body information of said document-distribution-request electronic mail based on the information of the type stored in said step c) and the mail address stored in said step d); and g) transmitting the thus-produced document-distribution-request electronic mail to the mail address specified in said header information, said distribution server, when having received said document-distribution-request electronic mail, transmitting the distribution file, the type of which is specified in said body information of the thus-received mail, to the mail address, specified in said body information of said mail, using a document-distribution electronic mail, wherein said at least one distribution file includes at least information of an operation manual of said network facsimile apparatus, and the distribution file including different contents of the operation manual can be specified by the user according to a user operation authority level input by the user.

13. A control method of a network facsimile apparatus, which is connected to a local area network which can be connected to the Internet, has a function of performing data transmission using electronic mail, and has a function of transmitting facsimile data to and receiving facsimile data from a facsimile apparatus using a predetermined facsimile transmission procedure via a public network, said method comprising the steps of:

a) providing a distribution server in the Internet, in which distribution server at least one distribution file is stored;

b) setting a user operation authority level for each of said at least one distribution file;

c) determining whether or not a user has given an instruction to transmit the distribution file;

d) when the result of the determination in said step c) is yes, having said user input the user operation authority level, and storing information of the thus-inputted user operation authority level;

e) having said user input a type of the distribution file to be transmitted, said type corresponding to the user operation authority level stored in said step d), and storing information of the thus-inputted type;

f) having said user input a transmission-destination mail address, and storing the thus-inputted mail address;

g) producing header information of document-distribution-request electronic mail based on a mail address of said distribution server;

h) producing body information of said document-distribution-request electronic mail based on the information of the type stored in said step e) and the mail address stored in said step f); and i) transmitting the thus-produced document-distribution-request electronic mail to the mail address specified in said header information, said distribution server, when having received said document-distribution-request electronic mail, transmitting the distribution file, the type of which is specified in said body information of the thus-received mail, to the mail address specified in said body information of said mail, using document-distribution electronic mail, wherein said at least one distribution file includes at least information of an operation manual of said network facsimile apparatus, and the distribution file including different contents of the operation manual can be specified by the user according to the user operation authority level input by the user.

14. A control method of a network facsimile apparatus, which is connected to a local area network which can be connected to the Internet, has a function of performing data transmission using electronic mail, and has a function of transmitting facsimile data to and receiving facsimile data from a facsimile apparatus using a predetermined facsimile transmission procedure via a public network, said method comprising the steps of:

a) providing a distribution server in the Internet, in which distribution server at least one distribution file is stored;

b) setting a user operation authority level for each of said at least one distribution file;

c) determining whether or not a user has given an instruction to transmit the distribution file;

d) when the result of the determination in said step c) is yes, having said user input the user operation authority level, and storing information of the thus-inputted user operation authority level;

e) determining whether or not the user operation authority level inputted in said step d) is a level of administrator user;

f) when the result of the determination in said step e) is yes, having said user input a password;

g) comparing the password inputted in said step f) with a previously stored password so as to determine whether or not said user is authenticated as an administrator user;

h) either when the result of the determination in said step g) is yes or when the result of the determination in said step e) is no, having said user input a type of the distribution file to be transmitted, said type corresponding to the user operation authority level stored in said step d), and storing information of the thus-inputted type;

i) having said user input a transmission-destination mail address, and storing the thus-inputted mail address;

j) producing header information of document-distribution-request electronic mail based on a mail address of said distribution server;

k) producing body information of said document-distribution request electronic mail based on the information of the type stored in said step h) and the mail address stored in said step i); and l) transmitting the thus-produced document-distribution-request electronic mail to the mail address specified in said header information, said distribution server, when having received said document-distribution-request electronic mail, transmitting the distribution file, the type of which is specified in said body information of the thus-received mail, to the mail address specified in said body information of said mail, using document-distribution electronic mail, wherein said at least one distribution file includes at least information of an operation manual of said network facsimile apparatus, and the distribution file including different contents of the operation manual can be specified by the user according to the user operation authority level input by the user.

* * * * *